United States Patent [19]

Larsen

[11] Patent Number: 5,207,027
[45] Date of Patent: May 4, 1993

[54] BELT WEATHERSTRIP WITH EXPANDABLE WIDTH AND METHOD

[75] Inventor: Douglas C. Larsen, Milford, Mich.

[73] Assignee: Standard Products Company, Cleveland, Ohio

[21] Appl. No.: 756,443

[22] Filed: Sep. 9, 1991

[51] Int. Cl.[5] .............................................. E06B 7/16
[52] U.S. Cl. ..................................... 49/482.1; 49/377; 49/490.1; 49/506
[58] Field of Search .................. 49/377, 490, 491, 506, 49/482, 479

[56] References Cited

U.S. PATENT DOCUMENTS

| | | |
|---|---|---|
| 1,837,775 | 12/1931 | Howard . |
| 2,443,959 | 6/1948 | Merrill . |
| 2,613,408 | 10/1952 | Bailey . |
| 2,899,238 | 8/1959 | Swanson . |
| 3,256,577 | 6/1966 | Bright ........................ 49/491 X |
| 3,706,173 | 12/1972 | Taylor . |
| 4,188,424 | 2/1980 | Ohno et al. . |
| 4,310,164 | 1/1982 | Mesnel . |
| 4,379,376 | 4/1983 | Adell . |
| 4,399,644 | 8/1983 | Bright . |
| 4,489,519 | 12/1984 | Adell . |
| 4,530,192 | 7/1985 | Ginster . |
| 4,745,665 | 5/1988 | Hilsenbeck ................ 49/491 X |
| 4,749,203 | 6/1988 | Bright ........................ 49/491 X |
| 4,949,507 | 8/1990 | Vaughan .................... 49/377 X |
| 5,038,521 | 8/1991 | Andrzejewski et al. ......... 49/491 X |

*Primary Examiner*—Philip C. Kannan

[57] ABSTRACT

A belt weatherstrip which is adapted for engagement over an end flange of a vehicle. The belt weatherstrip includes a one-piece core member which has a backing leg, an intermediate leg and a show surface leg which generally form a U-shaped member having a width which fits over the end flange of a vehicle. An elastomeric coating is extruded onto portions of the core member for providing at least one sealing lip extending from the core member. A plurality of perforations formed in the intermediate leg allow expansion in the width of the perforated leg such that the width of the weatherstrip may be varied along the length of the weatherstrip during forming of the weatherstrip. In accordance with the method steps of the present invention a weatherstrip core blank is first provided and thereafter a plurality of perforations are formed in the blank along a longitudinal portion of the blank. A core shape is formed from the blank by stretch bending the blank along the central longitudinal portion having the plurality of perforations for varying the cross-sectional dimension at the plurality of perforations thereby facilitating formation of a weatherstrip having a varying width and cross-section dimension.

13 Claims, 2 Drawing Sheets

BELT WEATHERSTRIP WITH EXPANDABLE WIDTH AND METHOD

BACKGROUND

The present invention relates to a bolt weatherstrip for a vehicle. More particularly, the present invention relate to a belt weatherstrip or the like which seals the portion of a vehicle between the sliding glass window and the show surface of a vehicle door, for instance.

Belt weatherstrips of the past have generally been utilized to weather-strip sheet metal flange areas of a vehicle. For instance, a vehicle door has a spot welded end flange connecting the outer show surface portion with the inner frame portion of the door. Such a flange is commonly provided for forming the window aperture. Such weatherstrips commonly include a sealing lip for sealing and stripping water off the glass window and an overhanging elastomeric strip portion which rests on the belt shelf of the outer surface of the car door in order to prevent water from entering the flange area.

It is desired in such construction s to provide a transitional surface of the weatherstrip which may include each a colored elastomer strip or chrome strip or the like which aesthetically matches the finishing contours of the vehicle surface, in order to produce a matched fit. In many vehicle designs a belt shelf having a transition edge is formed near the door flange which becomes a transition point from the weatherstrip show surface to the vehicle door show surface. Such edges may vary in width along the length of the door and thus have varying curvatures to which it is desirable to match a weatherstrip.

It is desired that such a belt weatherstrip will blend in with the design of the vehicle body and form a generally continuous surface at the transition edge of the vehicle door. This was accomplished in some past constructions by manufacturing a two-piece belt weather strip in accordance with the particular tolerances of the particular application. For instance, in prior constructions a belt weatherstrip core and show surface were manufactured to a particular specification of the transition edge to be matched. After the manufacture of this portion a separately manufactured glass sealing lip member was attached by staples or the like to the first portion and the belt weatherstrip was then assembled onto the vehicle end flange. One possible solution is also shown in prior application Ser. No. 466,998, now U.S. Pat. No. 4,949,507 filed Jan. 18, 1990, entitled "One-Piece Expandable Weatherstrip" which is commonly assigned herewith and which allows extra material for variation of the width of the weatherstrip.

The prior two-piece belt weatherstrips were relatively expensive to manufacture since the tooling and manufacturing equipment used must be changed for each particular vehicle model design. Additionally, such prior two-piece belt weatherstrip constructions required a two-step process for attaching the sealing lip portion to the belt weatherstrip core portion, thus, adding to the cost of labor involved in assembling the belt weatherstrip.

Therefore, it has been a goal in the art to provide a one-piece belt weatherstrip which would be suitable in such applications, thereby saving the costs of separate operations during manufacture thereof. It has also been a goal in the art to provide a belt weatherstrip which can be stretch formed to vary in its width such that it is adaptable to varying width belt shelfs. Such a construction would provide for reduced costs in tooling and manufacture of the part resulting in more efficient utilization of resources and cost savings in both manufacture and sales of the part.

SUMMARY OF THE INVENTION

In accordance with the present invention there is provided a belt weatherstrip which is adapted for engagement over an end flange of a vehicle. The belt weatherstrip includes a one-piece core member which has a back leg, an intermediate leg and a show surface leg which generally form a U-shaped member having a width which fits over the end flange of a vehicle. An elastomeric coating is extruded onto portions of the core member for providing at least one sealing lip extending from the core member. In the present invention a plurality of perforations formed in the intermediate leg allow expansion in the width of the perforated leg such that the width of the weatherstrip may be varied along the length of the weatherstrip during forming of the weatherstrip. This provides a better final fit with respect to the vehicle surfaces. In accordance with the method steps of the present invention a weatherstrip core blank is first provided and thereafter a plurality of perforations are formed in the blank along a longitudinal portion of the blank. A core shape is formed from the blank by stretch bending the blank along the central longitudinal portion having the plurality of perforations for varying the width of the intermediate leg and thus the cross-sectional dimension of the weatherstrip thereby facilitating formation of a weatherstrip having a varying width and cross-sectional dimension. Thus, a one-piece weatherstrip can be formed wherein the width of the weatherstrip is varied according to a final application merely through stretch bending and roll forming to provide a finished weatherstrip construction.

Other advantages of the present invention will be readily appreciated as same becomes better understood by reference to the following description when considered in connection with the accompanying drawings.

DESCRIPTION OF THE PREFERRED EMBODIMENTS

Figure 1:
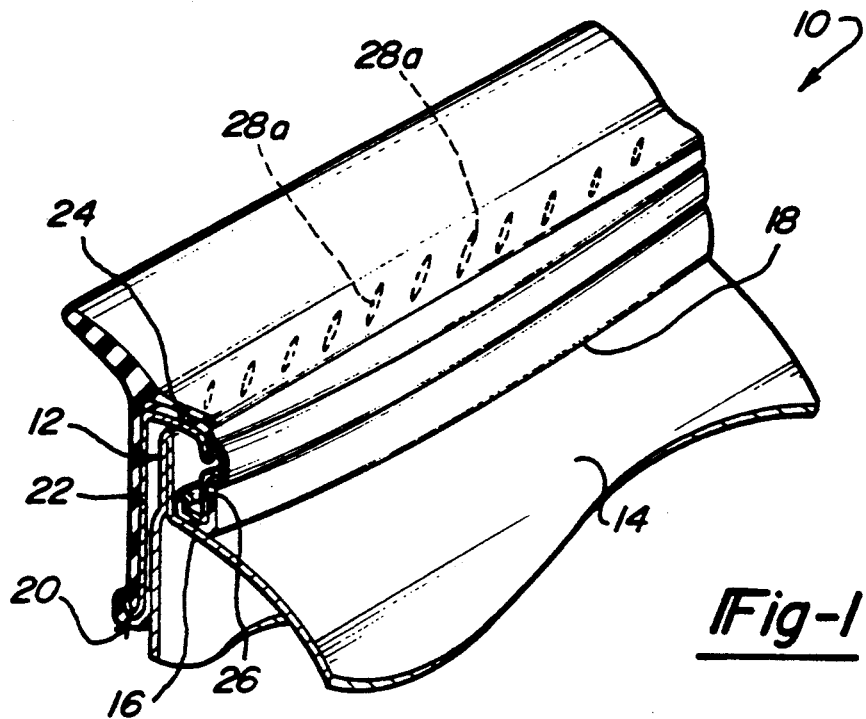
FIG. 1 is a perspective view of a belt weatherstrip in accordance with the present invention partially in cross-section.

In accordance with the present invention there is provided belt weatherstrip, generally shown at 10, which is adapted for engagement over an end flange, generally indicated at 12, of door 14 of a vehicle. In particular, referring to FIG. 1, a vehicle door 14 includes a belt shelf portion 16 and has a curvature across its length as shown by the curvature at the surface 18 wherein the belt weatherstrip 10 contacts the door 14.

The belt weatherstrip of the present invention includes a one-piece core member generally indicated at 20 which includes a back leg 22 and an intermediate leg 24 and an outer show surface leg 26. The legs 22, 24 and 26 form a generally U-shaped member which has a width for fitting over the end flange 12. A plurality of perforations 28 are provided in intermediate leg 24. Perforations 28 allow expansion of the width of the intermediate leg 24 as the width may be varied by stretch bending during forming of the weatherstrip to provide a better final fit with respect to the edge 18.

Figure 2:
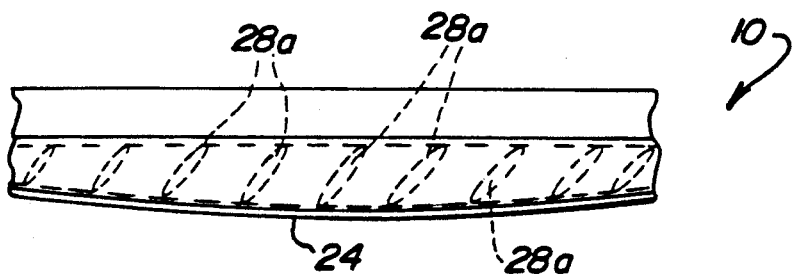
FIG. 2 is a top plan view showing the expanded cuts in the intermediate leg in phantom.
Figure 3:
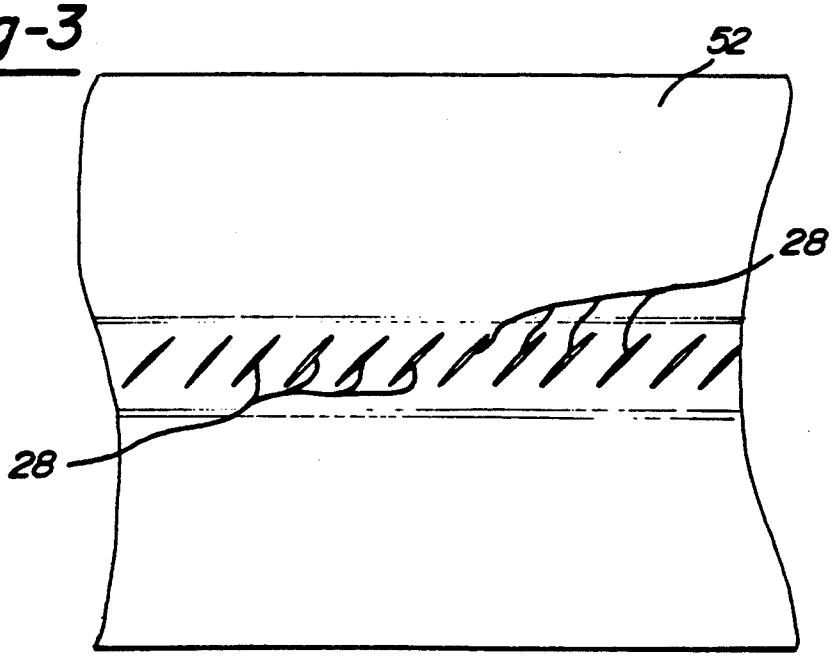
FIG. 3 is a plan view of a blank formed with cuts therein for use in the method of the present invention.

The intermediate leg 24 having the perforations 28 therein is shown in more detail in FIGS. 2 and 3. Referring to FIG. 3 the cuts are incorporated first into a core blank 52. The cuts 28 are provided in a central longitudinal portion of the blank 52 and are merely elongated cuts in the core blank 52 in their initial form. In a preferred embodiment, these cuts are formatted in a parallel fashion and at an angle to the longitudinal axis of the core blank or final weatherstrip. The cuts are sized such that they do not extend beyond the width of the intermediate leg and preferably the cuts extend substantially across the entire width of the intermediate leg 24. However, the perforations may be otherwise sized depending on the desired amount of stretch bending to be accomplished. Thereafter, the core is formed into the shape of the weatherstrip from the core blank and during formation is stretch bent about the central longitudinal section to the final curvaceous form as shown in FIG. 2. It will be readily noted in FIG. 2 that the cuts 28 in the central portion of the weatherstrip, wherein the width has been expanded, have allowed expansion and have been widened such that they appear as elliptical openings 28a in the intermediate leg 24. Thus, the perforations or cuts 28 and 28a in the expanded form allow for formation of the varying cross-sectional dimension along the width of the weatherstrip during for providing proper contours with respect to a final desired application in a vehicle.

Figure 4:
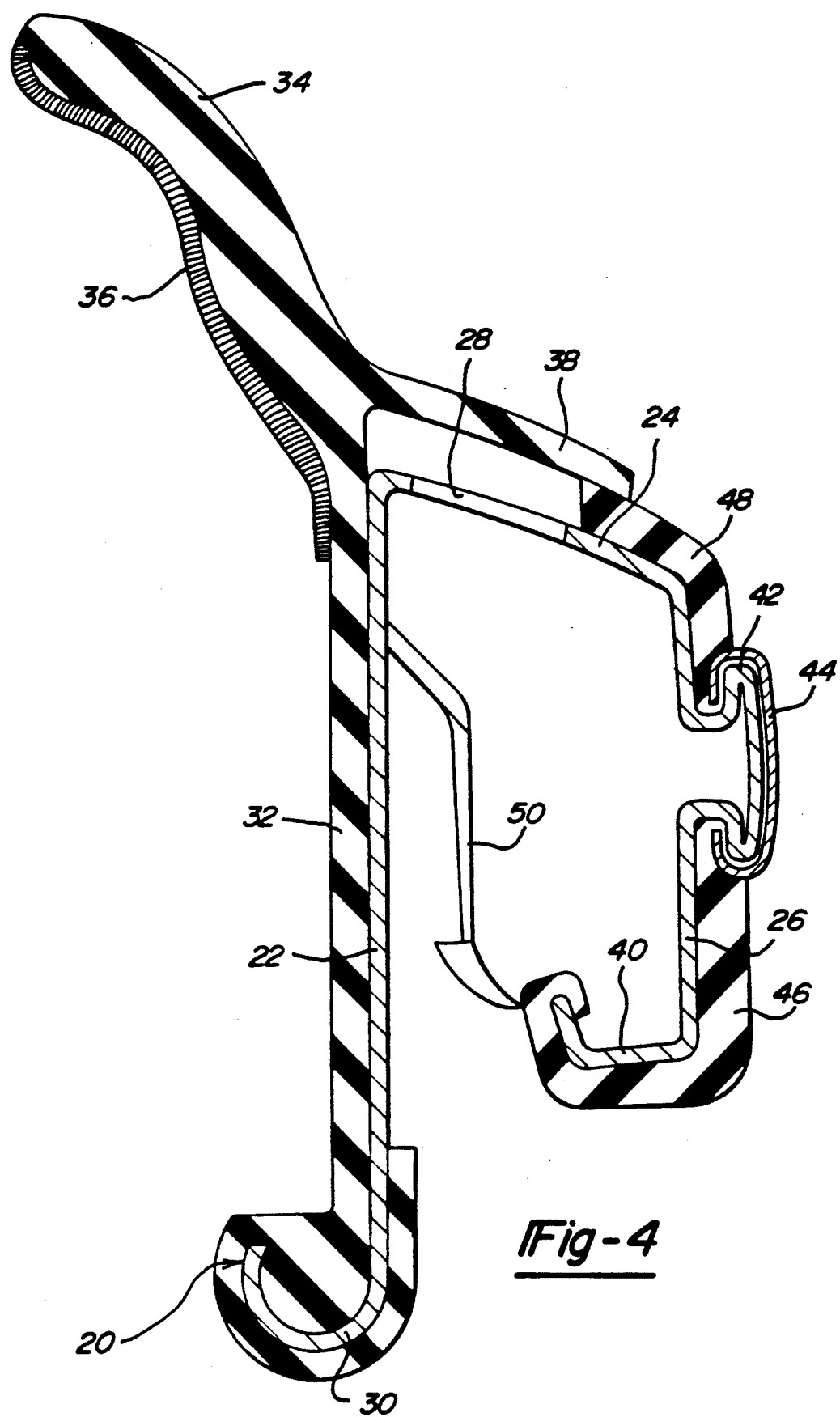
FIG. 4 is a detailed sectional view of the belt weatherstrip of FIG. 1.

Referring now to FIG. 4, in a preferred embodiment the leg 22 has an over-turned lower end 30. An elastomeric coating 32 is provided over the leg 22 and the end 30. A sealing lip 34 of the type which seals and strips water from the vehicle window is extruded along with the coating 32 and includes flocking 36 thereon as is common in such applications. A lip portion 38 is extruded and extends into the flangeway area of the intermediate leg 24 to overlap in the area of the perforations 28. This lip portion is spaced from the intermediate leg 24 such that the perforations are not visible in the final assembly.

The show surface leg 26 also includes an overturned flange 40 which provides for a good seal on the show surface of the vehicle. Also provided is a dove tailed portion 42 over which a stainless cap 44 may be fitted. Extruded coatings such as shown at 46 and 48 may be applied onto the core for various aesthetic effects as desired. The upper extrusion 48 is overlapped by the lip 38 in the construction of the present invention. The lip 38 is slideable along upper extrusion 48 for providing a suitable transition between the two surfaces irrespective of the width of the intermediate leg 24. This covers the cuts 28 on the intermediate leg 24 from view and allows the width of the leg 24 to be varied without affecting the aesthetic appearance of this area of the weatherstrip 10.

A means for attachment, such as retention clips 50, is provided for attaching the weatherstrip of the present invention onto the flange 12. Such clips are known in the art and are described in my aforementioned U.S. Pat. No. 4,949,507. Of course, other means for locking the belt weatherstrip onto an end flange may be incorporated herein without deviating from the scope of the present invention.

In accordance with the process aspects of the present invention a one-piece weatherstrip, which may be adapted for varying cross sectional widths and thereby accommodating a curvaceous belt, shelf is provided. The method includes the steps of first providing a weatherstrip core blank. A plurality of perforations are then provided on the blank along a longitudinal portion of the blank by way of die cutting or the like. A core shape of the weatherstrip is formed from the blank with the intermediate leg formed by stretch bending to vary the width of the weatherstrip and thereby accommodate the final dimensions of the belt shelf.

The plurality of perforations are preferably configured on the blank as parallel elongated cuts along a longitudinal axis. The cuts allow more malleability at the intermediate leg to facilitate stretch bending of the leg along its width. This adjusts the width of the weatherstrip to accommodate the belt shelf contour.

Preferably, the elastomeric coatings for forming sealing lips and the like are extruded onto the blank prior to roll forming and stretch bending of the blank to form the final weatherstrip. Of course, the coatings could be extruded after forming without deviating from the scope of the present invention.

While the above description constitutes the preferred embodiments of the present invention, it is to be appreciated that the invention is susceptible to modification, variation and change without departing from the proper scope and fair meaning of the accompanying claims.

What is claimed is:

1. A method of forming a one-piece weatherstrip into varying cross-sectional dimensions for varying the width of the weatherstrip to provide proper contour with respect to a final application comprising the steps of:
   a) providing a weatherstrip core blank;
   b) forming a plurality of perforations in said blank along a central longitudinal portion of the blank;
   c) forming a core shape of said weatherstrip from said blank and stretch bending the blank along the central longitudinal portion having said plurality of perforations for varying the cross-sectional dimension and thereby the width of said weatherstrip, said plurality of perforations facilitating formation of said varying cross-sectional dimension.

2. The method of claim 1 wherein said plurality of perforations further comprise a plurality of parallel cuts in said core blank.

3. The method of claim 2 wherein said cuts are angled to a longitudinal axis of said core blank.

4. The method of claim 3 wherein the cuts are sized such that said cuts extend substantially across the entire width of an intermediate leg of said weatherstrip.

5. A belt weatherstrip adapted for engagement over and end flange of a vehicle, said belt weatherstrip comprising:
   a one-piece core member including a backing leg, an intermediate leg and a show surface leg generally forming a U-shaped member having a width for fitting over the end flange;
   an elastomeric coating extruded onto at least portions of the core member for providing at least one sealing lip extending from said core member;
   a plurality of perforations formed in said intermediate leg whereby said perforations allow expansion in said width of said perforated leg such that said width may be varied during forming of the weatherstrip to provide a better final fit with respect to the vehicle.

6. The belt weatherstrip of claim 5 wherein said plurality of perforations further comprise elongated cuts in said intermediate leg.

7. The belt weatherstrip of claim 6 wherein the elongated cuts are parallel to one another.

8. The belt weatherstrip of claim 7 wherein the cuts are angled with respect to the longitudinal direction of said belt weatherstrip.

9. The belt weatherstrip of claim 8 wherein said cuts are sized such that they extend substantially across the entire width of said intermediate leg.

10. A belt weatherstrip adapted for engagement over an end flange of a vehicle, said belt weatherstrip comprising:
a one-piece core member including a backing leg, an intermediate leg and a show surface leg generally forming a U-shaped member having a width for fitting over the end flange;
an elastomeric coating extruding onto at least portion of the core member for providing at least one sealing lip extending from said core member;
a plurality of slits formed in said intermediate leg at an angle slanted with respect to a longitudinal axis of the leg whereby said slits allow expansion in said width of said intermediate leg such that said width may be varied during forming of the weatherstrip to provide a better final fit with respect to final contours of the vehicle.

11. The belt weatherstrip of claim 10 wherein said plurality of slits further comprised elongated cuts in said intermediate leg.

12. The belt weatherstrip of claim 11 wherein the elongated cuts are parallel to one another.

13. The belt weatherstrip of claim 12 wherein said cuts are sized such that they extend substantially across the entire width of said intermediate leg.

* * * * *